United States Patent
Kang et al.

(10) Patent No.: US 10,988,656 B2
(45) Date of Patent: Apr. 27, 2021

(54) RESIN COMPOSITION

(71) Applicant: LG Chem, Ltd., Seoul (KR)

(72) Inventors: Seong Kyun Kang, Daejeon (KR);
Yoon Gyung Cho, Daejeon (KR); Yang Gu Kang, Daejeon (KR); Eun Suk Park, Daejeon (KR); Sang Min Park, Daejeon (KR); Se Woo Yang, Daejeon (KR); Hyeon Choi, Daejeon (KR)

(73) Assignee: LG Chem, Ltd.

( * ) Notice: Subject to any disclaimer, the term of this patent is extended or adjusted under 35 U.S.C. 154(b) by 49 days.

(21) Appl. No.: 16/470,415

(22) PCT Filed: May 15, 2018

(86) PCT No.: PCT/KR2018/005544
§ 371 (c)(1),
(2) Date: Jun. 17, 2019

(87) PCT Pub. No.: WO2018/212553
PCT Pub. Date: Nov. 22, 2018

(65) Prior Publication Data
US 2019/0309207 A1 Oct. 10, 2019

(30) Foreign Application Priority Data
May 16, 2017 (KR) .................. 10-2017-0060628

(51) Int. Cl.
| C09K 5/14 | (2006.01) |
| C08G 18/32 | (2006.01) |
| C08G 18/42 | (2006.01) |
| C08G 18/66 | (2006.01) |
| C08G 18/73 | (2006.01) |
| C08K 3/22 | (2006.01) |
| C08K 7/18 | (2006.01) |
| C08K 3/013 | (2018.01) |
| C08L 75/04 | (2006.01) |
| C08L 101/00 | (2006.01) |

(52) U.S. Cl.
CPC ............ C09K 5/14 (2013.01); C08G 18/3206 (2013.01); C08G 18/4277 (2013.01); C08G 18/664 (2013.01); C08G 18/73 (2013.01); C08K 3/013 (2018.01); C08K 3/22 (2013.01); C08K 7/18 (2013.01); C08L 75/04 (2013.01); C08L 101/00 (2013.01); C08K 2003/2227 (2013.01); C08K 2201/001 (2013.01); C08K 2201/005 (2013.01)

(58) Field of Classification Search
CPC . C09K 5/14; C08K 3/013; C08K 3/22; C08K 7/18; C08K 2003/2227; C08K 2201/001; C08K 2201/005; C08K 2201/014; C08K 2201/003; C08K 2201/016; C08L 75/04; C08L 101/00; C08G 18/3206; C08G 18/4277; C08G 18/664; C08G 18/73; C09J 175/04
USPC .............................................. 252/75, 76, 79
See application file for complete search history.

(56) References Cited

U.S. PATENT DOCUMENTS

| 8,182,405 | B2 * | 5/2012 | Kurachi ............. G03G 15/0818 |
| | | | 492/18 |
| 9,745,411 | B2 * | 8/2017 | Nishiyama ............... H01L 33/56 |
| 10,683,444 | B2 * | 6/2020 | Takanashi ............... C08K 7/16 |
| 2002/0086801 | A1 | 7/2002 | Khatri |
| 2004/0254275 | A1 | 12/2004 | Fukui et al. |
| 2007/0106001 | A1 * | 5/2007 | Butler ..................... C08L 67/06 |
| | | | 524/430 |
| 2010/0080611 | A1 | 4/2010 | Kurachi et al. |
| 2015/0152310 | A1 * | 6/2015 | Immel ...................... C08K 3/22 |
| | | | 252/76 |
| 2015/0344733 | A1 * | 12/2015 | Tomizawa ............... C08K 9/04 |
| | | | 442/164 |
| 2016/0046791 | A1 * | 2/2016 | Tien ......................... C08K 5/01 |
| | | | 361/679.47 |
| 2016/0177024 | A1 | 6/2016 | Nishiyama et al. |

(Continued)

FOREIGN PATENT DOCUMENTS

| JP | H1192627 A | 4/1999 |
| JP | 2004346094 A | 12/2004 |
| JP | 4255287 B2 | 4/2009 |
| JP | 2011040565 A | 2/2011 |
| JP | 5155033 B2 | 2/2013 |
| JP | 5664563 B2 | 2/2015 |
| JP | 5761639 B2 | 8/2015 |
| JP | 5828835 B2 | 12/2015 |

(Continued)

OTHER PUBLICATIONS

International Search Report for PCT/KR2018/005544 dated Aug. 23, 2018.
Extended European Search Report including the Written Opinion for Application No. EP 18802691.8 dated Apr. 14, 2020, 6 pages.

Primary Examiner — Douglas J McGinty
(74) Attorney, Agent, or Firm — Lerner, David, Littenberg, Krumholz & Mentlik, LLP

(57) ABSTRACT

A thermally conductive resin composition is disclosed herein. The thermally conductive resin composition exhibits high thermal conductivity while having excellent handling properties. In an embodiment, a resin composition includes a resin component and 600 parts by weight or more of a thermally conductive filler relative to 100 parts by weight of the resin component. The thermally conductive filler comprise 30 to 50 wt % of a first thermally conductive filler having a D50 particle diameter of 35 μm or more, 25 to 45 wt % of a second thermally conductive filler having a D50 particle diameter in a range of 15 μm to 30 μm, and 15 to 35 wt % of a third thermally conductive filler having a D50 particle diameter of 1 to 4 μm, based on the total weight of the thermally conductive filler.

15 Claims, No Drawings

(56) References Cited

U.S. PATENT DOCUMENTS

2018/0127629 A1    5/2018   Takanashi et al.
2020/0220124 A1*   7/2020   Park .................... H01M 10/625

FOREIGN PATENT DOCUMENTS

| KR | 20100036942 A | 4/2010 |
|----|---------------|--------|
| KR | 20150105410 A | 9/2015 |
| KR | 20160024917 A | 3/2016 |
| WO | 2006023860 A2 | 3/2006 |
| WO | 2016190188 A1 | 12/2016 |

\* cited by examiner

RESIN COMPOSITION

CROSS-REFERENCE TO RELATED APPLICATIONS

The present application is a national phase entry under 35 U.S.C. § 371 of International Application No. PCT/KR2018/005544, filed on May 15, 2018, which claims priority from Korean Patent Application No. 10-2017-0060628 filed on May 16, 2017, the disclosures of which are incorporated herein by reference.

TECHNICAL FIELD

The present application relates to a resin composition.

BACKGROUND ART

Since batteries, televisions, videos, computers, medical instruments, office machines or communication devices, and the like generate heat during operation and the temperature increase due to the heat causes operation failure or destruction, a heat dissipating method or a heat dissipating member used therefor has been proposed.

For example, there is known a method in which heat is transferred to a cooling medium such as cooling water, or a temperature rise is suppressed through heat conduction to a heat sink using a metal plate having high thermal conductivity, such as aluminum or copper, and the like.

In order to efficiently transfer heat from a heat source to the cooling medium or the heat sink, it is advantageous that the heat source and the cooling medium or the heat sink are closely contacted or thermally connected as much as possible, and to this end, a heat conductive material can be used.

DISCLOSURE

Technical Problem

The present application relates to a resin composition. It is an object of the present application to provide a resin composition which is capable of forming a resin satisfying required physical properties such as thermal conductivity and insulation properties and has excellent handling properties such as viscosity and thixotropy.

Technical Solution

Among physical properties mentioned in this specification, when the measured temperature affects relevant physical properties, the physical properties are physical properties measured at room temperature, unless otherwise specified.

In the present application, the term room temperature is a natural temperature without being heated or cooled, which may be, for example, any temperature in a range of 10° C. to 30° C., or a temperature of about 23° C. or about 25° C. or so.

The present application relates to a resin composition. The resin composition may comprise a resin component and thermally conductive fillers.

In one example, the resin composition may be an adhesive composition, that is, an adhesive as such, or a composition capable of forming an adhesive through a reaction such as a curing reaction. Such a resin composition may be a solvent resin composition, a water-based resin composition, or a solventless resin composition. For example, the resin composition can be prepared by adding thermally conductive fillers to be described below to a resin composition capable of forming a known acrylic adhesive, epoxy adhesive, urethane adhesive, olefin adhesive, EVA (ethylene vinyl acetate) adhesive or silicone adhesive.

In the present application, the range of the term resin component includes components that can be converted into resins through a curing reaction or a polymerization reaction as well as components that are generally known as resins.

In one example, as the resin component, an adhesive resin or a precursor capable of forming an adhesive resin can be applied. An example of such a resin component includes an acrylic resin, an epoxy resin, a urethane resin, an olefin resin, an EVA (ethylene vinyl acetate) resin or a silicone resin, and the like, or a precursor such as polyol or an isocyanate compound, and the like, but is not limited thereto.

In one example, the resin composition of the present application may be a one-component resin composition or a two-component resin composition. The two-component resin composition is separated into a principal agent composition and a curing agent composition, as known in the art, and the two separated compositions are mixed and reacted to be capable of forming a resin, where when the resin composition of the present application is a two-component type, the resin composition containing the resin component and the fillers may be the principal agent composition, the curing agent composition or a mixture thereof, or may refer to a state after they have been mixed and reacted.

In one example, the resin composition may be a urethane resin composition, and may be a two-component urethane resin composition. The term two-component urethane resin composition is a composition capable of forming a resin by blending a principal agent composition and a curing agent composition, where the polyurethane can be formed by the reaction of the principal agent and the curing agent. In one example, the resin composition of the present application may be a principal agent composition of a two-component urethane resin composition, a curing agent composition of a two-component urethane resin composition or a mixture of the principal agent and curing agent compositions, or may refer to a mixture in which the resin has been formed by the urethane reaction in the mixture.

The principal agent composition of the two-component urethane-based resin composition may comprise at least polyol, and the curing agent composition may comprise an isocyanate compound such as polyisocyanate.

In this case, the urethane resin, that is, the polyurethane formed by the reaction of the two-component urethane resin composition may comprise at least a polyol-derived unit and a polyisocyanate-derived unit. In this case, the polyol-derived unit may be a unit in which the polyol is formed by a urethane reaction with the polyisocyanate, and the polyisocyanate-derived unit may be a unit in which the polyisocyanate is formed by a urethane reaction with the polyol.

In order to secure the physical properties, as the polyol at least included in the principal agent composition, a resin composition comprising polyol which is amorphous or has sufficiently low crystallinity may be applied.

In the present application, the term amorphous means a case where a crystallization temperature (Tc) and a melting temperature (Tm) are not observed in the following DSC (differential scanning calorimetry) analysis. The DSC analysis can be performed in a range of −80° C. to 60° C. at a rate of 10° C./minute, which can be measured, for example, by a method of raising the temperature from 25° C. to 60° C. at the above rate, lowering it to −80° C. again and raising it to 60° C. again. Furthermore, the sufficiently low crystallinity herein means a case where the melting point (Tm)

observed in the DSC analysis is about 20° C. or lower, about 15° C. or lower, about 10° C. or lower, about 5° C. or lower, about 0° C. or lower, about −5° C. or lower, about −10° C. or lower, or about −20° C. or lower. The lower limit of the melting point is not particularly limited, and for example, the melting point may be about −80° C. or higher, about −75° C. or higher, or about −70° C. or higher.

As the polyol as above, an ester-based polyol to be described below can be exemplified. That is, among the ester-based polyols, a carboxylic acid-based polyol or a caprolactone-based polyol, specifically polyol having a structure to be described below, effectively satisfies the above-mentioned characteristics.

Generally, the carboxylic acid-based polyol is formed by a urethane reaction of a component comprising dicarboxylic acid and polyol (ex. diol or triol), and the caprolactone-based polyol is formed by reacting caprolactone and polyol (ex. diol or triol), where the polyol satisfying the above-described physical properties can be constituted through control of the kind and ratio of each component.

In one example, the polyol may be polyol represented by Formula 1 or 2 below.

[Formula 1]

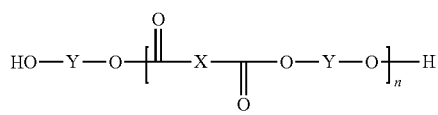

[Formula 2]

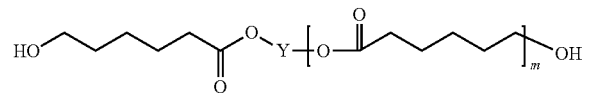

In Formulas 1 and 2, X is a dicarboxylic acid-derived unit, Y is a polyol-derived unit, for example, a triol or diol unit, and n and m are arbitrary numbers.

Here, the dicarboxylic acid-derived unit is a unit formed by a urethane reaction of dicarboxylic acid with polyol, and the polyol-derived unit is a unit formed by a urethane reaction of polyol with dicarboxylic acid or caprolactone.

That is, when a hydroxyl group of the polyol and a carboxyl group of the dicarboxylic acid are reacted, a water ($H_2O$) molecule is desorbed by a condensation reaction to form an ester bond, where after the dicarboxylic acid forms the ester bond by the condensation reaction, X in Formula 1 above means a moiety excluding the ester bond moiety, and after the polyol also forms the ester bond by the condensation reaction, Y is a moiety excluding the ester bond, and the ester bond is represented in Formula 1.

In addition, after the polyol forms an ester bond with caprolactone, Y in Formula 2 also represents a moiety excluding the ester bond.

On the other hand, when the polyol-derived unit of Y herein is a unit derived from polyol containing three or more hydroxyl groups such as a triol unit, a structure in which the Y moiety is branched in the structure of the above formula may be realized.

The kind of the dicarboxylic acid-derived unit of X in Formula 1 is not particularly limited, but it may be any one unit selected from the group consisting of a phthalic acid unit, an isophthalic acid unit, a terephthalic acid unit, a trimellitic acid unit, a tetrahydrophthalic acid unit, a hexahydrophthalic acid unit, a tetrachlorophthalic acid unit, an oxalic acid unit, an adipic acid unit, an azelaic acid unit, a sebacic acid unit, a succinic acid unit, a malic acid unit, a glutaric acid unit, a malonic acid unit, a pimelic acid unit, a suberic acid unit, a 2,2-dimethylsuccinic acid unit, a 3,3-dimethylglutaric acid unit, a 2,2-dimethylglutaric acid unit, a maleic acid unit, a fumaric acid unit, an itaconic acid unit and a fatty acid unit for securing units and desired physical properties, and an aliphatic dicarboxylic acid-derived unit is more advantageous than an aromatic dicarboxylic acid-derived unit in consideration of the glass transition temperature of the cured resin layer.

In Formulas 1 and 2, the kind of the polyol-derived unit of Y is not particularly limited, but it may be any one or two or more selected from the group consisting of an ethylene glycol unit, a propylene glycol unit, an 1,2-butylene glycol unit, a 2,3-butylene glycol unit, an 1,3-propanediol unit, an 1,3-butanediol unit, an 1,4-butanediol unit, an 1,6-hexanediol unit, a neopentyl glycol unit, an 1,2-ethylhexyldiol unit, an 1,5-pentanediol unit, an 1,10-decanediol unit, an 1,3-cyclohexanedimethanol unit, an 1,4-cyclohexanedimethanol unit, a glycerin unit and a trimethylol propane unit for securing units and desired physical properties.

In Formula 1, n is an arbitrary number, and the range may be selected in consideration of desired physical properties, and may be, for example, about 2 to 10 or 2 to 5.

In Formula 2, m is an arbitrary number, and the range may be selected in consideration of desired physical properties, and may be, for example, about 1 to 10 or 1 to 5.

When n and m in Formulas 1 and 2 are excessively large, the crystallinity of the polyol can be strongly expressed.

The molecular weight of this polyol may be adjusted in consideration of desired low viscosity characteristics, durability or adhesiveness, and the like, which may be, for example, in a range of about 300 to 2,000. The molecular weight mentioned in this specification may be, for example, a weight average molecular weight measured by using GPC (gel permeation chromatograph), and unless otherwise specified herein, the molecular weight of a polymer means a weight average molecular weight.

The kind of the polyisocyanate contained in the curing agent composition of the two-component urethane-based resin composition is not particularly limited, but it may be advantageous that it is an alicyclic series in order to secure desired physical properties. In this specification, the term polyisocyanate may mean a multifunctional isocyanate compound containing at least two isocyanate groups.

The polyisocyanate may be an aromatic polyisocyanate compound such as tolylene diisocyanate, diphenylmethane diisocyanate, phenylenediisocyanate, polyethylenephenylene polyisocyanate, xylene diisocyanate, tetramethylxylylene diisocyanate, trizine diisocyanate, naphthalene diisocyanate and triphenylmethane triisocyanate, an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate, or an alicyclic polyisocyanate such as transcyclohexane-1,4-diisocyanate, isophorone diisocyanate, bis(isocyanate methyl) cyclohexane diisocyanate or dicyclohexylmethane diisocyanate, and the like, a carbodiimide-modified polyisocyanate or an isocyanurate-modified polyisocyanate of any one or two or more of the foregoing, and the like can be used, but the application of polyisocyanates other than aromatics is appropriate.

The ratio of the polyol to the polyisocyanate in the resin composition is not particularly limited and is appropriately controlled so as to enable the urethane reaction thereof.

The resin composition may comprise fillers together with the resin component. The fillers may be thermally conductive fillers. The term thermally conductive filler means a material known to have thermal conductivity of about 0.5 W/mK or more, about 1 W/mK or more, 1.5 W/mK or more, 2 W/mK or more, 2.5 W/mK or more, 3 W/mK or more, 4 W/mK or more, 4.5 W/mK or more, about 5 W/mK or more, 5.5 W/mK or more, 6 W/mK or more, 6.5 W/mK or more, 7 W/mK or more, 7.5 W/mK or more, 8 W/mK or more, 8.5 W/mK or more, 9 W/mK or more, 9.5 W/mK or more, 10 W/mK or more, 10.5 W/mK or more, 11 W/mK or more, 11.5 W/mK or more, 12 W/mK or more, 12.5 W/mK or more, 13 W/mK or more, 13.5 W/mK or more, 14 W/mK or more, 14.5 W/mK or more, or about 15 W/mK or more. In one example, the thermal conductivity of the thermally conductive filler may be about 400 W/mK or less, about 350 W/mK or less, about 300 W/mK or less, about 250 W/mK or less, about 200 W/mK or less, about 150 W/mK or less, about 100 W/mK or less, about 90 W/mK or less, about 80 W/mK or less, about 70 W/mK or less, about 60 W/mK or less, about 50 W/mK or less, about 40 W/mK or less, about 30 W/mK or less, about 20 W/mK or less, or about 15 W/mK or less or so. The kind of thermally conductive fillers is not particularly limited, but ceramic fillers can be applied in consideration of insulation and the like. For example, ceramic particles such as alumina, AlN (aluminum nitride), BN (boron nitride), silicon nitride, SiC or BeO may be used. If insulation properties can be secured, application of carbon fillers such as graphite may also be considered.

The resin composition may comprise the thermally conductive fillers in an amount of about 600 parts by weight or more relative to 100 parts by weight of the resin component. In another example, the ratio of the fillers may be 650 parts by weight or more, or 700 parts by weight or more, relative to 100 parts by weight of the resin component. The ratio may be about 2,000 parts by weight or less, about 1,500 parts by weight or less, or about 1,100 parts by weight or less, relative to 100 parts by weight of the resin component. It is possible to secure desired physical properties such as thermal conductivity and insulation within the ratio range of the fillers.

When the resin composition is a principal agent composition or a curing agent composition of a two-component resin composition, the ratio of the fillers in the resin composition mentioned in this specification may be a ratio of the resin component that is a principal agent of the principal agent composition, or a ratio of the curing agent that is a resin component of the curing agent composition, or may be a ratio of the final resin formed by the reaction of the principal agent and the curing agent.

If the excessive amount of the fillers is applied for securing the thermal conductivity and the insulation as above, the viscosity of the resin composition is greatly increased and the handling property is accordingly deteriorated, and even after the resin material is formed, it contains bubbles or voids, whereby the thermal conductivity may be lowered.

Accordingly, in the resin composition, at least three kinds of fillers having different particle diameters are applied at a predetermined ratio.

For example, the resin composition may comprise a first thermally conductive filler having a D50 particle diameter of 35 μm or more, a second thermally conductive filler having a D50 particle diameter in a range of 15 μm to 30 μm, and a third thermally conductive filler having a D50 particle diameter of 1 to 4 μm.

Here, the D50 particle diameter is a particle diameter (median diameter) at 50% of accumulation of particle size distribution on a volumetric basis, which means a particle diameter at the point where the cumulative value becomes 50% in the cumulative curve that the particle size distribution is obtained on a volumetric basis and the whole volume is set to 100%. Such a D50 particle diameter can be measured by a laser diffraction method.

In one example, the D50 particle diameter of the first thermally conductive filler may be in a range of 35 to 80 μm or in a range of about 40 to 70 μm. Also, the D50 particle diameter of the second thermally conductive filler may be in a range of 15 to 25 μm or in a range of about 20 to 25 μm. Furthermore, the D50 particle diameter of the third thermally conductive filler may be in a range of 1 to 3 μm or in a range of about 2 to 3 μm.

The relationship of the D50 particle diameters in the respective thermally conductive fillers may be controlled, and for example, a ratio (A/B) of the D50 particle diameter (A) of the first thermally conductive filler to the D50 particle diameter (B) of the second thermally conductive filler may be in a range of 1.5 to 10, and a ratio (B/C) of the D50 particle diameter (B) of the second thermally conductive filler to the D50 particle diameter (C) of the third thermally conductive filler may be in a range of 8 to 15.

In another example, the ratio (A/B) may be 2 or more, and may be 9 or less, 8 or less, 7 or less, 6 or less, or 5 or less. In another example, the ratio (B/C) may be 9 or more, or 10 or more, and may be 14 or less, 13 or less, or 12 or less.

The resin composition may comprise 30 to 50 wt % or about 35 to 45 wt % of the first thermally conductive filler, and 25 to 45 wt %, about 25 to 40 wt % or about 30 to 45 wt % of the second thermally conductive filler, and may comprise 15 to 35 wt % or about 20 to 30 wt % of the third thermally conductive filler, when the total weight of the first to third thermally conductive fillers is 100 wt %.

By applying three kinds of fillers having the particle diameters in the ratios, it is possible to provide a resin composition in which the handling property is secured by exhibiting appropriate viscosity even when an excessive amount of fillers is applied.

The shape of the filler is not particularly limited, which may be selected in consideration of the viscosity and thixotropy of the resin composition, the settling possibility in the composition, desired thermal resistance or thermal conductivity, insulation, a filling effect or dispersibility, and the like. For example, it is advantageous to use a spherical filler in consideration of the amount to be filled, but in consideration of formation of a network, conductivity, thixotropy, etc., a non-spherical filler, for example, a filler having a shape such as a needle shape or a plate shape can also be used.

In the present application, the term spherical particle means a particle having sphericity of about 0.95 or more, and the non-spherical particle means a particle having sphericity of less than 0.95. The sphericity can be confirmed through particle shape analysis of particles, which can be measured by the method described in the examples to be described below.

In one example, all the spherical fillers, that is, fillers having sphericity of 0.95 or more may be used as the first to third thermally conductive fillers in consideration of the filling effect as described above. In another example, at least one of the first to third thermally conductive fillers may be a non-spherical filler having sphericity of less than 0.95. For example, when spherical fillers are used as the first and second thermally conductive fillers and non-spherical particles are used as the third thermally conductive filler, the composition may exhibit thixotropy.

The resin composition may basically comprise the above components, that is, the resin component and the thermally conductive fillers, and may also comprise other components, if necessary. For example, the resin composition may further comprise a viscosity control agent, such as a thixotropic agent, a diluent, a dispersing agent, a surface treatment agent or a coupling agent, for controlling viscosity, for example, for increasing or decreasing viscosity, or for controlling viscosity according to shear force.

The thixotropic agent can control the viscosity of the resin composition according to shear force, so that a process of manufacturing a battery module can be effectively performed. The usable thixotropic agent can be exemplified by fumed silica and the like.

The diluent or dispersing agent is usually used for lowering the viscosity of the resin composition, and as long as it can exhibit the above action, a variety of shapes known in the art can be used without limitation.

The surface treatment agent is used for surface treatment of the filler introduced into the resin composition, and as long as it can exhibit the above action, a variety of shapes known in the art can be used without limitation.

The coupling agent may be used, for example, to improve the dispersibility of the thermally conductive fillers such as alumina, and as long as it can exhibit the above action, a variety of shapes known in the art can be used without limitation.

The resin composition may further comprise a flame retardant or a flame retardant aid. Such a resin composition can form a flame retardant resin composition. As the flame retardant, various known flame retardants can be applied without particular limitation, and for example, solid phase filler-type flame retardants or liquid flame retardants and the like can be applied. The flame retardant includes an organic flame retardant such as melamine cyanurate or an inorganic flame retardant such as magnesium hydroxide, but is not limited thereto.

When the amount of the filler filled in the resin composition is large, a liquid type flame retardant material (TEP, triethyl phosphate or TCPP, tris(1,3-chloro-2-propyl)phosphate, etc.) may also be used. Furthermore, a silane coupling agent capable of acting as a flame retardant synergist may also be added.

The resin composition may comprise any one or two or more of the above components.

Such a resin composition can form a resin having excellent thermal conductivity and satisfying other required physical properties such as insulation.

For example, the resin composition may have thermal conductivity of about 2 W/mK or more, 2.5 W/mK or more, 3 W/mK or more, 3.5 W/mK or more, or 4 W/mK or more, or may form such a resin. The thermal conductivity may be 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. The thermal conductivity may be, for example, a numerical value measured according to ASTM D5470 standard or ISO 22007-2 standard. The thermal conductivity can be secured by controlling the kind of the resin components used in the resin composition and the ratios of the thermally conductive fillers as described above, and the like. For example, among resin components known to be generally usable as adhesives, it is known that an acrylic resin, a urethane resin and a silicone resin have similar heat conduction properties to each other, an epoxy resin has excellent thermal conductivity relative to these resins, and an olefin resin has higher thermal conductivity than the epoxy resin. Therefore, it is possible to select one having excellent thermal conductivity among the resins as necessary. However, in general, the desired thermal conductivity cannot be secured with only the resin component, so that the thermal conductivity can be achieved by incorporating the filler component into the resin layer at a proper ratio.

The resin composition may be an adhesive material, as described above, and may have adhesive force of about 50 gf/10 mm or more, about 70 gf/10 mm or more, about 80 gf/10 mm or more, or about 90 gf/10 mm or more, and about 1,000 gf/10 mm or less, about 950 gf/10 mm or less, about 900 gf/10 mm or less, about 850 gf/10 mm or less, about 800 gf/10 mm or less, about 750 gf/10 mm or less, about 700 gf/10 mm or less, about 650 gf/10 mm or less, or about 600 gf/10 mm or less, or may form a resin layer having this adhesive force. The adhesive force may be a value measured at a peeling speed of about 300 mm/min and a peeling angle of 180 degrees. Furthermore, the adhesive force may be an adhesive force to aluminum.

The resin composition is an electrically insulating resin composition, which may have an insulation breakdown voltage of about 3 kV/mm or more, about 5 kV/mm or more, about 7 kV/mm or more, 10 kV/mm or more, 15 kV/mm or more, or 20 kV/mm or more, as measured based on ASTM D149, or may form such a resin layer. The higher the value of the insulation breakdown voltage is, it exhibits more excellent insulating properties, and thus the insulation breakdown voltage is not particularly limited, but it may be about 50 kV/mm or less, 45 kV/mm or less, 40 kV/mm or less, 35 kV/mm or less, or 30 kV/mm or less, considering compositions or the like. Such an insulation breakdown voltage can also be controlled by controlling the insulation of the resin component or the type of the filler, and the like. In general, among the thermally conductive fillers, the ceramic filler is known as a component that can secure insulation.

The resin composition may be a flame retardant resin composition. The term flame retardant resin composition may mean a resin composition showing a V-0 rating in UL 94 V Test (vertical burning test) or a resin composition capable of forming such a resin.

It may be advantageous that the resin composition also has a low shrinkage ratio during curing or after curing. Through this, it is possible to prevent the occurrence of peeling or voids, and the like that may occur during manufacturing or use processes. The shrinkage ratio can be appropriately adjusted within a range capable of exhibiting the above-described effect, which may be, for example, less than 5%, less than 3%, or less than about 1%. The lower the value of the shrinkage ratio is, the more advantageous it is, and thus the lower limit is not particularly limited.

It may be advantageous that the resin composition also has a low coefficient of thermal expansion (CTE). Through this, it is possible to prevent the occurrence of peeling or voids, and the like that may occur during manufacturing or use processes. The coefficient of thermal expansion can be appropriately adjusted within a range capable of exhibiting the above-described effect, which may be, for example, less than 300 ppm/K, less than 250 ppm/K, less than 200 ppm/K, less than 150 ppm/K, or less than about 100 ppm/K. The lower the value of the coefficient of thermal expansion is, the more advantageous it is, and thus the lower limit is not particularly limited.

The resin composition may also exhibit an appropriate viscosity by comprising the above components. In one example, the resin composition may have a viscosity at room temperature (frequency: 10 Hz) in a range of 50 Pas to 500 Pas.

Such a resin composition may exhibit excellent physical properties such as excellent handling properties, processability and high thermal conductivity, thereby being used effectively as a heat dissipation material or a heat conduction material in various devices or instruments, and the like, including batteries, televisions, videos, computers, medical instruments, office machines or communication devices, and the like.

Advantageous Effects

The present application can provide a thermally conductive resin composition exhibiting high thermal conductivity while having excellent handling properties. The thermally conductive resin composition can be kept excellent in all other physical properties such as insulation.

MODE FOR INVENTION

Hereinafter, the resin composition of the present application will be described in detail by way of examples and comparative examples, but the scope of the present application is not limited by the following resin compositions.

1. Evaluation of Thermal Conductivity

The thermal conductivity of the resin composition was measured according to ASTM D5470 standard. After a resin layer formed using a resin composition was placed between two copper bars, one of the two copper bars was brought into contact with a heater and the other was brought into contact with a cooler, and then a thermal equilibrium state (a state of showing a temperature change of about 0.1° C. or less for 5 minutes) was made by adjusting the capacity of the cooler while keeping the heater at a constant temperature, according to ASTM D5470 standard.

The temperature of each copper bar was measured in the thermal equilibrium state, and the thermal conductivity (K, unit: W/mK) was evaluated according to the following equation. Upon evaluating the thermal conductivity, the pressure applied to the resin layer was adjusted to be about 11 Kg/25 cm$^2$, and when the thickness of the resin layer was changed during the measurement, the thermal conductivity was calculated based on the final thickness.

$K=(Q \times dx)/(A \times dT)$ <Thermal Conductivity Equation>

In Equation above, K is thermal conductivity (W/mK), Q is heat (unit: W) transferred per unit time, dx is the thickness of the resin layer (unit: m), A is the cross-sectional area (unit: m$_2$) of the resin layer, and dT is the temperature difference (unit: K) between the copper bars.

2. D50 Particle Diameter of Filler

The D50 particle diameter of the filler was measured with a MASTERSIZER3000 instrument from Marvern Inc., based on ISO-13320 standard. Ethanol was used as a solvent upon the measurement. The incident laser is scattered by the particles dispersed in the solvent, and the intensity and the directional value of the scattered laser vary depending on the size of the particles, which are analyzed using the Mie theory. Through the above analysis, the particle diameter can be evaluated by obtaining the distribution through conversion to the diameter of a sphere having the same volume as that of the dispersed particle and obtaining the D50 value as the median value of the distribution through that.

3. Evaluation of Sphericity of Filler

The sphericity of the filler as a three-dimensional particle is defined as the ratio (S'/S) of the surface area (S') of the sphere having the same volume as the particle to the surface area (S) of the particle, which is usually an average value of circularity for the actual particles.

The circularity is a ratio of a boundary of a circle having the same area (A) as the image obtained from the two-dimensional image of the particle to the boundary (P) of the image, theoretically being obtained by the following equation and a value from 0 to 1, and the circularity is 1 for an ideal circle.

$Circularity = 4\pi A/P^2$ <Circularity Equation>

In this specification, the sphericity value is an average value of the circularity measured by a particle shape analysis instrument (FPIA-3000) from Marvern Inc.

4. Viscosity of Resin Composition

The viscosity of the resin composition was measured in a frequency sweep mode at 25° C. for the section from 0.1 to 100 Hz, after equipping an ARES-G2 instrument from TA Company with 8 mm parallel plates and then positioning the composition between the plates so as not to flow down, and the values at 10 Hz were described in Table 1.

Example 1

As a resin composition, a two-component urethane-based adhesive composition was prepared. A principal agent composition comprising, as a caprolactone-based polyol of Formula A below, the polyol having m of Formula A below, as a number of repeated units, in a range of about 1 to 3 and containing an ethylene glycol and propylene glycol-derived unit as Y of Formula A below being a polyol-derived unit, was used as a principal agent composition, and a composition comprising polyisocyanate (HDI, hexamethylene diisocyanate) was used as a curing agent composition. Alumina was compounded to the resin composition so as to be capable of exhibiting thermal conductivity. The alumina was compounded to each of the principal agent composition and the curing agent composition by bisecting about 1,000 parts by weight of alumina by the same amount relative to 100 parts by weight of the polyurethane formed after the curing of the two-component urethane-based adhesive composition. As the alumina, alumina (first filler) having a D50 particle diameter of about 40 μm, alumina (second filler) having a D50 particle diameter of about 20 μm and alumina (third filler) having a D50 particle diameter of about 2 μm were used, and about 400 parts by weight of the first filler, about 300 parts by weight of the second filler and about 300 parts by weight of the third filler were applied, relative to 100 parts by weight of the polyurethane. As the first to third fillers, all spherical fillers having a sphericity of 0.95 or more were used. The resin composition was prepared by adjusting equivalent amounts of the principal agent composition and the curing agent composition of the two-component composition and compounding them.

[Formula A]

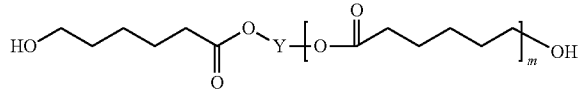

Example 2

A resin composition was prepared in the same matter as in Example 1, except that about 400 parts by weight of alumina (first filler, spherical filler having sphericity of 0.95 or more) having a D50 particle diameter of about 70 μm, about 300 parts by weight of alumina (second filler, spherical filler having sphericity of 0.95 or more) having a D50 particle diameter of about 20 μm and about 300 parts by weight of alumina (third filler, spherical filler having sphericity of 0.95 or more) having a D50 particle diameter of about 2 μm were used as the thermally conductive fillers, relative to 100 parts by weight of the polyurethane.

Example 3

A resin composition was prepared in the same matter as in Example 1, except that about 400 parts by weight of alumina (first filler, spherical filler having sphericity of 0.95 or more) having a D50 particle diameter of about 40 μm, about 400 parts by weight of alumina (second filler, spherical filler having sphericity of 0.95 or more) having a D50 particle diameter of about 20 μm and about 200 parts by weight of alumina (third filler, spherical filler having sphericity of 0.95 or more) having a D50 particle diameter of about 2 μm were used as the thermally conductive fillers, relative to 100 parts by weight of the polyurethane.

Example 4

A resin composition was prepared in the same matter as in Example 1, except that about 350 parts by weight of alumina (first filler, spherical filler having sphericity of 0.95 or more) having a D50 particle diameter of about 40 μm, about 350 parts by weight of alumina (second filler, spherical filler having sphericity of 0.95 or more) having a D50 particle diameter of about 20 μm and about 300 parts by weight of alumina (third filler, spherical filler having sphericity of 0.95 or more) having a D50 particle diameter of about 2 μm were used as the thermally conductive fillers, relative to 100 parts by weight of the polyurethane.

Example 5

A resin composition was prepared in the same matter as in Example 1, except that about 450 parts by weight of alumina (first filler, spherical filler having sphericity of 0.95 or more) having a D50 particle diameter of about 40 μm, about 350 parts by weight of alumina (second filler, spherical filler having sphericity of 0.95 or more) having a D50 particle diameter of about 20 μm and about 200 parts by weight of alumina (third filler, spherical filler having sphericity of 0.95 or more) having a D50 particle diameter of about 2 μm were used as the thermally conductive fillers, relative to 100 parts by weight of the polyurethane.

Example 6

A resin composition was prepared in the same matter as in Example 1, except that about 400 parts by weight of alumina (first filler, spherical filler having sphericity of 0.95 or more) having a D50 particle diameter of about 40 μm, about 300 parts by weight of alumina (second filler, spherical filler having sphericity of 0.95 or more) having a D50 particle diameter of about 20 μm and about 300 parts by weight of alumina (third filler, non-spherical filler having sphericity of less than 0.95) having a D50 particle diameter of about 2 μm were used as the thermally conductive fillers, relative to 100 parts by weight of the polyurethane.

Example 7

A resin composition was prepared in the same matter as in Example 1, except that about 400 parts by weight of alumina (first filler, spherical filler having sphericity of 0.95 or more) having a D50 particle diameter of about 70 μm, about 300 parts by weight of alumina (second filler, spherical filler having sphericity of 0.95 or more) having a D50 particle diameter of about 20 μm and about 300 parts by weight of alumina (third filler, non-spherical filler having sphericity of less than 0.95) having a D50 particle diameter of about 2 μm were used as the thermally conductive fillers, relative to 100 parts by weight of the polyurethane.

Comparative Example 1

A resin composition was prepared in the same matter as in Example 1, except that about 630 parts by weight of alumina (first filler, spherical filler having sphericity of 0.95 or more) having a D50 particle diameter of about 40 μm and about 270 parts by weight of alumina (second filler, spherical filler having sphericity of 0.95 or more) having a D50 particle diameter of about 20 μm were used as the thermally conductive fillers, relative to 100 parts by weight of the polyurethane.

Comparative Example 2

A resin composition was prepared in the same matter as in Example 1, except that about 630 parts by weight of alumina (first filler, spherical filler having sphericity of 0.95 or more) having a D50 particle diameter of about 40 μm and about 270 parts by weight of alumina (second filler, spherical filler having sphericity of 0.95 or more) having a D50 particle diameter of about 2 μm were used as the thermally conductive fillers, relative to 100 parts by weight of the polyurethane.

Comparative Example 3

A resin composition was prepared in the same matter as in Example 1, except that about 630 parts by weight of alumina (first filler, spherical filler having sphericity of 0.95 or more) having a D50 particle diameter of about 20 μm and about 270 parts by weight of alumina (second filler, spherical filler having sphericity of 0.95 or more) having a D50 particle diameter of about 2 μm were used as the thermally conductive fillers, relative to 100 parts by weight of the polyurethane.

Comparative Example 4

A resin composition was prepared in the same matter as in Example 1, except that about 400 parts by weight of alumina (first filler, spherical filler having sphericity of 0.95 or more) having a D50 particle diameter of about 40 μm, about 300 parts by weight of alumina (second filler, spherical filler having sphericity of 0.95 or more) having a D50 particle diameter of about 5 μm and about 300 parts by weight of alumina (third filler, spherical filler having sphericity of 0.95 or more) having a D50 particle diameter of about 2 μm were used as the thermally conductive fillers, relative to 100 parts by weight of the polyurethane.

Comparative Example 5

A resin composition was prepared in the same matter as in Example 1, except that about 400 parts by weight of alumina (first filler, spherical filler having sphericity of 0.95 or more) having a D50 particle diameter of about 20 μm, about 300 parts by weight of alumina (second filler, spherical filler having sphericity of 0.95 or more) having a D50 particle diameter of about 10 μm and about 300 parts by weight of alumina (third filler, spherical filler having sphericity of 0.95 or more) having a D50 particle diameter of about 2 μm were used as the thermally conductive fillers, relative to 100 parts by weight of the polyurethane.

Comparative Example 6

A resin composition was prepared in the same matter as in Example 1, except that about 400 parts by weight of alumina (first filler, spherical filler having sphericity of 0.95 or more) having a D50 particle diameter of about 40 μm, about 300 parts by weight of alumina (second filler, spherical filler having sphericity of 0.95 or more) having a D50 particle diameter of about 20 μm and about 300 parts by weight of alumina (third filler, spherical filler having sphericity of 0.95 or more) having a D50 particle diameter of about 5 μm were used as the thermally conductive fillers, relative to 100 parts by weight of the polyurethane.

Comparative Example 7

A resin composition was prepared in the same matter as in Example 1, except that about 400 parts by weight of alumina (first filler, spherical filler having sphericity of 0.95 or more) having a D50 particle diameter of about 40 μm, about 300 parts by weight of alumina (second filler, spherical filler having sphericity of 0.95 or more) having a D50 particle diameter of about 20 μm and about 300 parts by weight of alumina (third filler, spherical filler having sphericity of 0.95 or more) having a D50 particle diameter of about 0.5 μm were used as the thermally conductive fillers, relative to 100 parts by weight of the polyurethane.

Comparative Example 8

A resin composition was prepared in the same matter as in Example 1, except that about 300 parts by weight of alumina (first filler, spherical filler having sphericity of 0.95 or more) having a D50 particle diameter of about 40 μm, about 300 parts by weight of alumina (second filler, spherical filler having sphericity of 0.95 or more) having a D50 particle diameter of about 20 μm and about 300 parts by weight of alumina (third filler, spherical filler having sphericity of 0.95 or more) having a D50 particle diameter of about 2 μm were used as the thermally conductive fillers, relative to 100 parts by weight of the polyurethane.

Comparative Example 9

A resin composition was prepared in the same matter as in Example 1, except that about 300 parts by weight of alumina (first filler, spherical filler having sphericity of 0.95 or more) having a D50 particle diameter of about 40 μm, about 500 parts by weight of alumina (second filler, spherical filler having sphericity of 0.95 or more) having a D50 particle diameter of about 20 μm and about 200 parts by weight of alumina (third filler, spherical filler having sphericity of 0.95 or more) having a D50 particle diameter of about 2 μm were used as the thermally conductive fillers, relative to 100 parts by weight of the polyurethane.

Comparative Example 10

A resin composition was prepared in the same matter as in Example 1, except that about 500 parts by weight of alumina (first filler, spherical filler having sphericity of 0.95 or more) having a D50 particle diameter of about 40 μm, about 200 parts by weight of alumina (second filler, spherical filler having sphericity of 0.95 or more) having a D50 particle diameter of about 20 μm and about 300 parts by weight of alumina (third filler, spherical filler having sphericity of 0.95 or more) having a D50 particle diameter of about 2 μm were used as the thermally conductive fillers, relative to 100 parts by weight of the polyurethane.

Comparative Example 11

A resin composition was prepared in the same matter as in Example 1, except that about 500 parts by weight of alumina (first filler, spherical filler having sphericity of 0.95 or more) having a D50 particle diameter of about 20 μm, about 400 parts by weight of alumina (second filler, spherical filler having sphericity of 0.95 or more) having a D50 particle diameter of about 10 μm and about 100 parts by weight of alumina (third filler, spherical filler having sphericity of 0.95 or more) having a D50 particle diameter of about 2 μm were used as the thermally conductive fillers, relative to 100 parts by weight of the polyurethane.

The thermal conductivity and viscosity determined for Examples and Comparative Examples above were summarized and described in Table 1 below.

TABLE 1

|  |  | Thermal Conductivity (unit: W/mK) | Viscosity (unit: Pa · s) |
|---|---|---|---|
| Example | 1 | 3.0 | 59.7 |
|  | 2 | 3.1 | 61.3 |
|  | 3 | 3.0 | 68.7 |
|  | 4 | 3.0 | 71.9 |
|  | 5 | 3.0 | 63.5 |
|  | 6 | 3.1 | 80 |
|  | 7 | 3.1 | 75 |
| Comparative Example | 1 | 2.6 | 351 |
|  | 2 | 2.5 | 298 |
|  | 3 | 2.4 | 345 |
|  | 4 | 2.8 | 103.8 |
|  | 5 | 2.8 | 121.1 |
|  | 6 | 2.8 | 110.8 |
|  | 7 | 2.7 | 195.5 |
|  | 8 | 2.6 | 143.9 |
|  | 9 | 2.7 | 140.3 |
|  | 10 | 2.8 | 122.4 |
|  | 11 | 2.8 | 120.6 |

From the results of Table 1, it can be seen that the composition having low viscosity is obtained even when an excessive amount of fillers is introduced to secure high thermal conductivity.

For example, from the results of Examples and Comparative Examples 1 to 3, it can be confirmed that Comparative Examples 1 to 3 exhibit remarkably high viscosity even though the thermally conductive fillers are contained at lower ratios.

Also, comparing Examples and Comparative Examples 4 to 7, it can be confirmed that even when three kinds of thermally conductive fillers are applied in the same manner, the results are significantly different depending on the D50 particle diameter of each filler, and it can be confirmed from the results of Comparative Examples 8 to 11 that there is also a large difference in the results depending on the ratios of the three kinds of particles and the like.

Furthermore, in the case of Examples 6 and 7, it was confirmed that while the shapes of the fillers changed, the resin composition exhibited thixotropy.

The invention claimed is:

1. A resin composition, comprising:
a resin component; and
600 parts by weight or more of a thermally conductive filler relative to 100 parts by weight of the resin component,
wherein the thermally conductive filler comprise 35 to 45 wt % of a first thermally conductive filler having a D50 particle diameter (A) of 35 μm or more, 25 to 45 wt % of a second thermally conductive filler having a D50 particle diameter (B) in a range of 15 μm to 30 μm, and 15 to 35 wt % of a third thermally conductive filler having a D50 particle diameter (C) of 1 to 4 μm, based on the total weight of the thermally conductive filler,
wherein the resin composition has a thermal conductivity of 3.0 to 50.0 W/mK.

2. The resin composition according to claim 1, wherein the resin component is polyol, an isocyanate compound, a urethane resin, an acrylic resin, an epoxy resin, an olefin resin or a silicone resin.

3. The resin composition according to claim 1, wherein the resin component is any one selected from the group consisting of polyol and an isocyanate compound, or polyurethane.

4. The resin composition according to claim 3, wherein the polyol is an ester-based polyol.

5. The resin composition according to claim 4, wherein the ester-based polyol is an amorphous ester-based polyol or an ester-based polyol having a melting point (Tm) of 20° C. or lower.

6. The resin composition according to claim 4, wherein the ester-based polyol is represented by Formula 1 or 2 below:

[Formula 1]

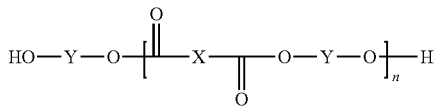

[Formula 2]

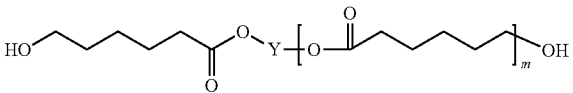

wherein, X is a dicarboxylic acid-derived unit, Y is a polyol-derived unit, n is a number in a range of 2 to 10 and m is a number in a range of 1 to 10.

7. The resin composition according to claim 1, wherein the D50 particle diameter (A) of the first thermally conductive filler is in a range of 35 to 80 μm.

8. The resin composition according to claim 1, wherein the D50 particle diameter (B) of the second thermally conductive filler is in a range of 15 to 25 μm.

9. The resin composition according to claim 1, wherein the D50 particle diameter (C) of the third thermally conductive filler is in a range of 1 to 3 μm.

10. The resin composition according to claim 1, wherein a ratio of the D50 particle diameter (A) of the first thermally conductive filler to the D50 particle diameter (B) of the second thermally conductive filler is in a range of 1.5 to 10.

11. The resin composition according to claim 1, wherein a ratio of the D50 particle diameter (B) of the second thermally conductive filler to the D50 particle diameter (C) of the third thermally conductive filler is in a range of 8 to 15.

12. The resin composition according to claim 1, wherein the first, second, and third thermally conductive fillers have sphericity of 0.95 or more.

13. The resin composition according to claim 1, wherein at least one of the first, second, or third thermally conductive fillers has sphericity of less than 0.95.

14. The resin composition according to claim 1, wherein the first and second thermally conductive fillers have sphericity of 0.95 or more and the third thermally conductive filler has sphericity of less than 0.95.

15. The resin composition according to claim 1, wherein the thermally conductive filler is present in an amount ranging from 600 parts by weight to 2,000 parts by weight relative to 100 parts by weight of the resin component.

* * * * *